United States Patent [19]

Isaka

[11] Patent Number: 5,706,388
[45] Date of Patent: Jan. 6, 1998

[54] RECORDING SYSTEM RECORDING RECEIVED INFORMATION ON A RECORDING MEDIUM WHILE REPRODUCING RECEIVED INFORMATION PREVIOUSLY RECORDED ON THE RECORDING MEDIUM

[75] Inventor: Osamu Isaka, Kashiwa, Japan

[73] Assignee: Ricoh Company, Ltd., Tokyo, Japan

[21] Appl. No.: 777,057

[22] Filed: Dec. 30, 1996

Related U.S. Application Data

[63] Continuation of Ser. No. 330,587, Oct. 28, 1994, abandoned.

[30] Foreign Application Priority Data

Oct. 29, 1993 [JP] Japan ............ 5-294403

[51] Int. Cl.$^6$ ........................ H04N 5/76
[52] U.S. Cl. ........................ 386/125; 386/46
[58] Field of Search ............ 386/46, 125, 52, 386/62, 65, 68, 91, 64; 348/714, 715, 154, 155; H04N 5/76

[56] References Cited

U.S. PATENT DOCUMENTS

| | | | |
|---|---|---|---|
| 3,812,287 | 5/1974 | Lemelson | 348/155 |
| 4,802,025 | 1/1989 | Shinada | 358/337 |
| 5,134,499 | 7/1992 | Sata et al. | 358/335 |
| 5,153,726 | 10/1992 | Billing | 348/716 |
| 5,189,691 | 2/1993 | Dunlap | 358/335 |
| 5,194,963 | 3/1993 | Dunlap et al. | 358/314 |
| 5,329,320 | 7/1994 | Yifrach | 348/738 |
| 5,438,423 | 8/1995 | Lynch et al. | 358/335 |

FOREIGN PATENT DOCUMENTS 3936994  5/1991  Germany ............ H04N 5/78

*Primary Examiner*—Thai Tran
*Assistant Examiner*—Huy Nguyen
*Attorney, Agent, or Firm*—Woodcock Washburn Kurtz Mackiewicz & Norris LLP

[57] ABSTRACT

A recording system performs a reproducing operation for previously recorded information without stopping a recording operation for information currently being received. A video signal is received from an external video-signal-supplying source via a communication channel. The recording system is connected to a display unit having a screen. A recording medium is provided on which the video signal is recorded. A recording unit automatically records the video signal currently being received on the recording medium when a recording start command is received while an image according to the video signal currently being received is being projected. A reproducing unit reproduces the video signal recorded on the recording medium when a reproducing start command is received. A controlling unit controls operations of the recording unit and the reproducing unit so that the reproducing operation on the video signal previously recorded on the recording medium and the recording operation on the video signal currently being received are performed at the same time, and thereby the video signal currently being received is recorded on the recording medium while an image is projected in accordance with the video signal previously recorded on the recording medium.

13 Claims, 4 Drawing Sheets

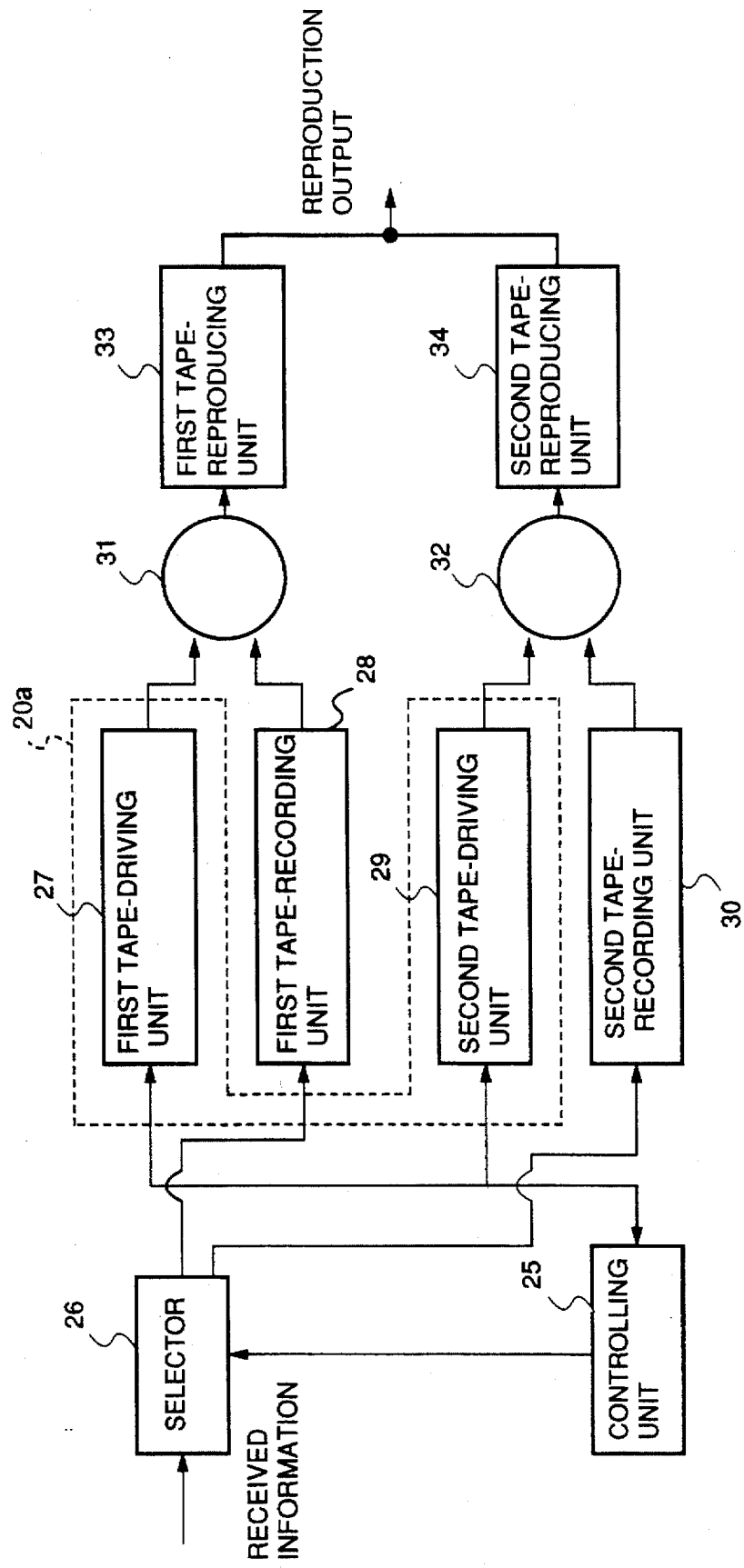

RECORDING SYSTEM RECORDING RECEIVED INFORMATION ON A RECORDING MEDIUM WHILE REPRODUCING RECEIVED INFORMATION PREVIOUSLY RECORDED ON THE RECORDING MEDIUM

This is a continuation of application Ser. No. 08/330,587, filed Oct. 28, 1994, abandoned.

BACKGROUND OF THE INVENTION

The present invention generally relates to a recording system used for a television apparatus or a multimedia information apparatus which displays a video image received from an external video-signal-supplying source, and more particularly, to a recording system which can record received information on a recording medium while reproducing received information previously recorded on the recording medium.

In these years, a video cassette-tape recorder (VCR) is widely used for recording a television program or video information received via a multimedia information system. We are frequently forced to stop watching a television program due to an incoming telephone call, an unexpected visitor or to have a meal. In such a case, the television program can be recorded by using the VCR. However, if the television program is still being recorded, that is, if the television program has not ended when one returns to watch the television, the part of the television program previously recorded by the VCR cannot be reproduced until the television program is ended.

SUMMARY OF THE INVENTION

It is a general object of the present invention to provide a recording system for a television apparatus or a multimedia information apparatus in which recording system the above-mentioned disadvantages are eliminated.

A more specific object of the present invention is to provide a recording system that can perform a reproducing operation for previously recorded information without stopping a recording operation for information currently being received.

In order to achieve the above-mentioned objects, there is provided according to the present invention a recording system which records a video signal received from an external video-signal-supplying source via a communication channel, the recording system being connected to a display unit having a screen on which an image is projected in accordance with a video signal supplied by the recording system, the recording system comprising:

a recording medium on which the video signal received from the external video-signal-supplying source is recorded;

a recording unit for recording a video signal currently being received from the external video-signal-supplying source on the recording medium;

a reproducing unit for reproducing a video signal previously recorded on the recording medium; and controlling unit for controlling operations of the recording means and the reproducing means so that the recording unit automatically starts a recording operation when a recording start command representing a start of the recording operation is received while an image according to the video signal currently being received is being projected on the screen, and the reproducing unit starts a reproducing operation when a reproducing start command representing a start of a reproducing operation is received, and the reproducing operation on the video signal previously recorded on the recording medium and the recording operation on the video signal currently being received are performed at the same time when the reproduction command is received, and thereby the video signal currently being received is recorded on the recording medium while an image is continuously projected on the screen in accordance with the video signal previously recorded on the recording medium.

Other objects, features and advantages of the present invention will become more apparent from the following detailed description when read in conjunction with the accompanying drawings.

BRIEF DESCRIPTION OF THE DRAWINGS

FIG. 4 is a block diagram of an essential part of a third embodiment of a recording system according to the present invention.

DETAILED DESCRIPTION OF THE PREFERRED EMBODIMENTS

Figure 1:
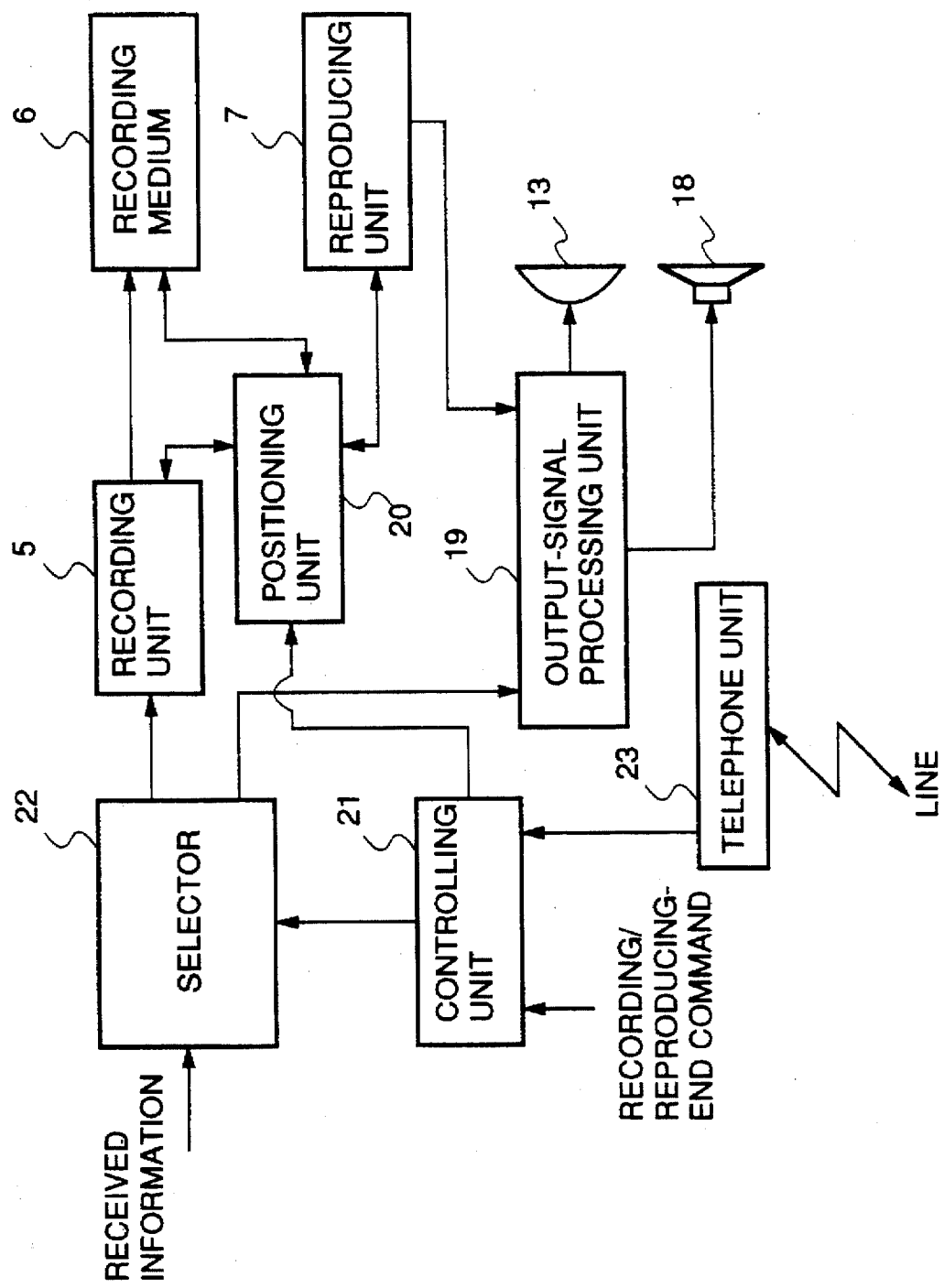
FIG. 1 is a block diagram of a first embodiment of a recording system according to the present invention.

A description will now be given of a first embodiment of a recording system according to the present invention. FIG. 1 shows a block diagram of the first embodiment of the recording system according to the present invention.

The recording system shown in FIG. 1 comprises a recording medium 6 such as a magnetic disk or an optical disk. The recording system has a recording head and a reproducing head separated from the recording head so that a recording operation and a reproducing operation can be performed independently at the same time.

The recording operation of the recording device 6 is performed by a recording-controlling unit 5 which includes the recording head. The reproducing operation is performed by a reproducing unit 7 which includes the reproducing head. A controlling unit 21 comprising a CPU, a ROM and a RAM, controls the entire operation of the recording system.

The first embodiment of the recording system shown in FIG. 1 is provided with a telephone unit 23 comprising communicating means including a tone generator and a tone detector, a communication line connector, a microphone, a speaker, and a transmitting/receiving circuit. The recording system is also provided with a display unit 13 and a speaker unit 18. The display unit 13 displays video information on a screen provided therein in accordance with a video signal. The speaker unit 18 converts an audio signal included in the video information into an audio sound. The video signal and the audio signal are supplied to the display unit 13 and the speaker unit 18, respectively, by an output-signal processing unit 19.

The recording system receives information from an external video-signal-supplying source, and the received information is supplied to a selector 22 which selectively provides the received information to either the recording unit 5 or the output-signal processing unit 19 in accordance with a command supplied by the controlling unit 21.

Additionally, the recording system shown in FIG. 1 is provided with a positioning unit 20 which controls positioning of the recording head and the reproducing head on the recording medium 6 in accordance with a command supplied by the controlling unit 21.

When a recording operation is not performed, the received information, in this case a television signal of a currently broadcast television program, is supplied to the output-signal processing unit 19 by the selector 22 so that the received information is displayed by the display apparatus in real-time. In this state, if the telephone unit 23 receives an incoming call from a remote terminal, and the telephone unit 23 is off hooked, a communication-start detection signal indicating an off-hook state of the telephone unit 23 is output to the controlling unit 21. The controlling unit 21 controls the selector 22 to select, as a receiver of the television signal, the recording unit 5. Accordingly, the television program currently being broadcast is automatically recorded on the recording medium 6 by the recording unit 5 after the telephone unit 23 receives the incoming call. The recording of the television program continues until a recording-end command is input, for example, by an operator pressing a key.

After a telephone conversation of the incoming call is ended and the telephone unit 23 is on hooked, the telephone unit 23 outputs to the controlling unit 21 a communication-end detection signal indicating an on-hook state of the telephone unit 23 as a reproduction-start signal for starting a reproducing operation of the information previously recorded on the recording medium 6. The controlling unit 21 then supplies a reproduction-request command to the positioning unit 20. The positioning unit 20 moves the reproducing head of the reproducing unit 7 to a reproduction-start position from which the recording of the television program being broadcast was started when the incoming telephone call was received. It should be noted that the recording operation for the television program is still continued while the reproducing operation is performed.

When both recording and reproducing-end commands are input to the controlling unit 21 by the operator, the controlling unit 21 controls the selector to select the output-signal processing unit 19 as a receiver of the television signal currently being received. In this case, remaining information already recorded on the recording medium 6 is ignored. It should be noted that a recording-end command and a reproducing-end command may be separately input to the controlling unit 23. When the recording-end command is input, only the recording operation is stopped. Thereafter, when the reproducing-end command is input, the reproducing operation is stopped, and the selector supplies the received television signal to the output-signal processing unit 19 so as to display a corresponding video image on the screen of the display unit 13.

If another call is received when the recording operation and the reproducing operation are performed at the same time, the reproducing operation is stopped. The reproducing operation is restarted from a position where the telephone unit 23 received the other call. Additionally, image information received by the telephone unit 23 can be displayed on the display unit 13. This can be done by supplying the image information sent via a communication line of the telephone unit 23 to the display unit 13 via the controlling unit 21, the selector 22 and the output-signal processing unit 19. In this case, a format of the image information may be converted into the same data format as that of the television signal by the controlling unit 21, or may instead be converted by a sending apparatus of the image information. It should be noted that both audio and video information may be received by providing an ISDN interface to the telephone unit 23.

The recording-start command may be supplied by other apparatus such as a doorbell. In this case, a visitor-detecting signal is supplied to the controlling unit 21 when a visitor rings the doorbell. If a video camera is installed with the doorbell at an entrance door, a video signal may be automatically supplied to the display unit 13 via the controlling unit 21.

The above-mentioned commands such as the recording-start command or the reproducing-start command may be input by a remote controller which is a well known television apparatus.

Figure 2:
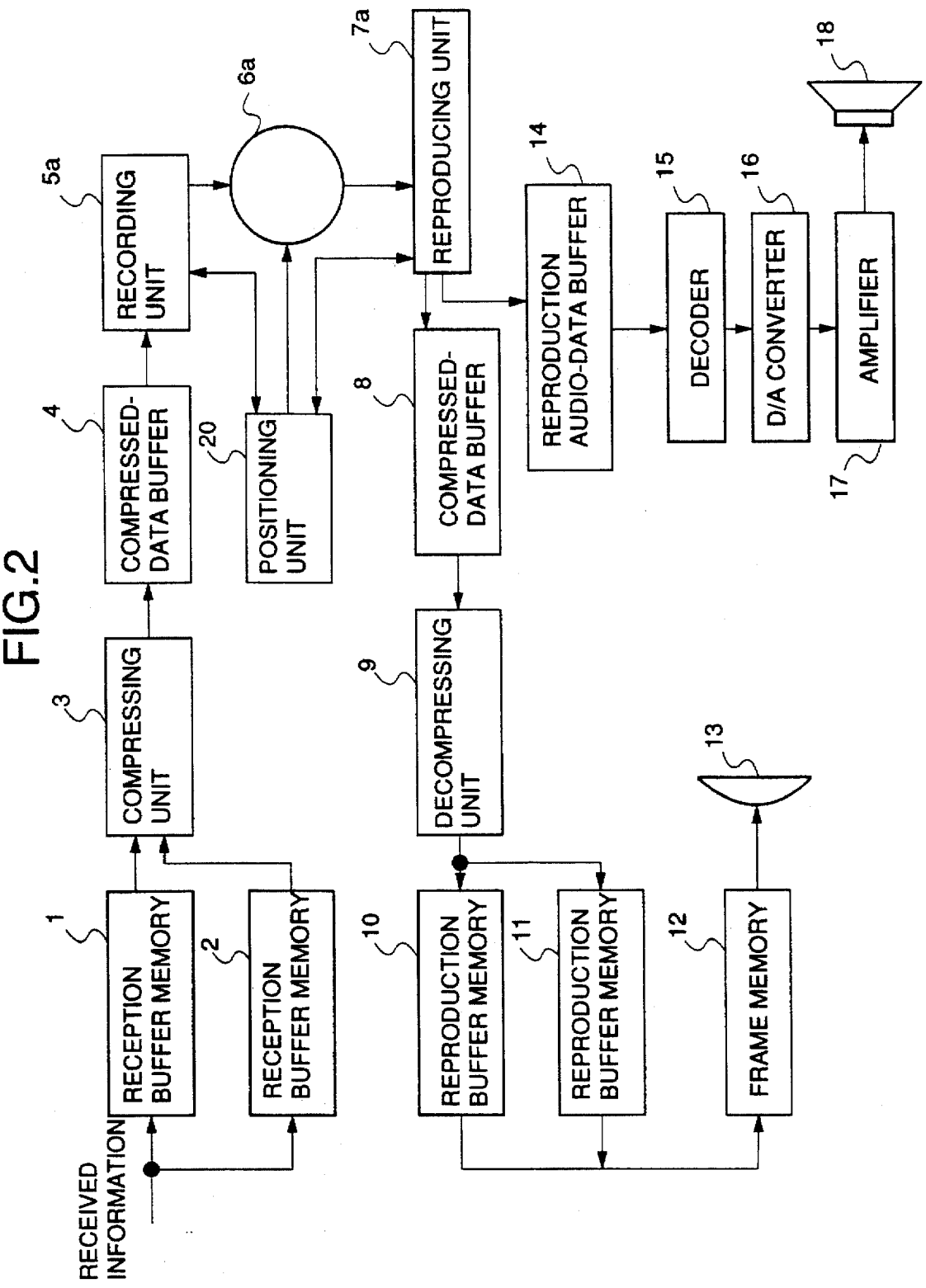
FIG. 2 is a block diagram of an essential part of a second embodiment of a recording system according to the present invention.

A description will now be given, with reference to FIG. 2, of a second embodiment according to the present invention. FIG. 2 is a block diagram of an essential part of the second embodiment of a recording system according to the present invention. This embodiment is directed to a method in which the recording operation and the reproducing operation are performed by a single recording/reproducing head.

In FIG. 2, received information converted into digital data is temporarily stored in reception buffer memories 1 and 2. The digital data is then supplied to a compressing unit 3 so that the digital data is compressed. The compressed digital data is temporarily stored in a compressed-data buffer 4. The compressed digital data stored in the compressed-data buffer 4 is then supplied to a recording unit 5a which is similar to the recording unit 5 of the above-mentioned first embodiment, and the compressed digital data is recorded on a recording medium 6a such as a hard disk or an optomagnetic disk having concentric tracks or spiral tracks.

A reproducing unit 7a reproduces the recorded data on the recording medium 6a, reproducing being performed in recorded order. The reproduced data is temporarily stored in a compressed-data buffer 8, and then supplied to a decompressing unit 9 so as to decompress the reproduced data. The decompressed data is supplied to either of reproduction buffer memories 10 and 11, and then is stored in a frame memory 12. The frame memory supplies the data therein to the display unit 13 frame by frame.

A description will now be given of a recording operation of the above-mentioned second embodiment. The digital data corresponding to the received information is firstly supplied to and stored in the reception-buffer memory 1. When the digital data corresponding to a predetermined number of frames has been stored in the buffer 1, the digital data is supplied to the reception buffer memory 2 instead of the reception buffer memory 1.

On the other hand, when the reception buffer memory 1 has become full, the digital data stored in the reception buffer memory 1 is sequentially read out by a controlling unit (not shown in FIG. 2), and input to the compressing unit 3. The digital data is compressed by the compressing unit 3, for example, into about one thirtieth of an original data length. The compressed data is then temporarily stored in the compressed-data buffer 4, and then recorded on the recording medium 6a by the recording unit 5a. The data is recorded in consecutive areas on the recording medium 6a in the receiving order.

An outputting speed of the reception buffer memory 1 is a few times faster than an inputting speed thereto. A recording of the compressed data is performed at a throughput about thirty times faster than the throughput of an output of the reception buffer memory 1 since the data has been compressed by the compressing unit 3.

The read-out operation for the reception buffer memory 1 is completed before the reception buffer memory 2 becomes full. When an amount of the digital data stored in the reception buffer memory 2 reaches an amount corresponding to the predetermined number of frames, the supply of the digital data is switched to the reception buffer memory 1, and the above-mentioned recording operation is repeated.

When a reproducing operation is started before the recording is completed, the recording/reproducing head associated with the recording medium 6a is moved to a reading position by the positioning unit 20. The reading position corresponds to a position where the previous recording was started. A predetermined amount of reproduction is then performed by the reproducing unit 7a. The reproduced data is supplied to the reproduction buffer memory 10 in the manner described above. While the reproducing operation is performed, the digital data corresponding to the received information is continuously supplied to and stored in either of the reception buffer memories 1 and 2.

When a predetermined amount of data has been reproduced and stored in the reproduction buffer memory 10, a read out operation for the reproduction buffer memory 10 is started. The data read out from the reproduction-buffer memory is supplied to the frame memory 12, and then output to the display unit 13 frame by frame at a speed of, for example, 30 frames per second. At the same time, the recording/reproducing head is returned to the last recording position to continue the recording operation for the data supplied from either of the reception buffer memories 1 and 2. When the predetermined amount of data is recorded on the recording medium 6a, the recording/reproducing head is again moved to the last reproducing position to reproduce the predetermined amount of data similarly to the above mentioned manner. At this time, the reproduced data is stored in the reproduction buffer memory 11 instead of the reproduction buffer memory 10.

In the above-mentioned operation, a time needed for outputting the predetermined amount of data from the reproduction buffer memory 10 is greater than a sum of a time needed for the movement of the recording/reproducing head, a recording time needed for the predetermined amount of data, a reproducing time needed for reproducing the predetermined amount of data, and a time needed for storing the reproduced data to the reproduction buffer memory 11. That is, the predetermined amount of data is stored in one of the reproduction buffer memories 10 and 11 before all data in the other of the reproduction buffer memories 10 and 11 has been output.

As mentioned above, in the recording system shown in FIG. 2, the recording operation and the reproducing operation are performed alternately while the reproduced video signal is continuously supplied to the display unit 13.

It should be noted that the compressing unit 3 and the decompressing unit 9 are provided for reducing the amount of data to be recorded, and thereby reducing the recording time. However, if the recording/reproducing speed is faster than the outputting speed to the display unit, there is no need to compress the data to be recorded, and thus the compressing unit 3 and the decompressing unit 9 may be omitted.

The received information includes video information and audio information. The audio information converted into digital audio data is stored in a particular area of the reception buffer memories 1 and 2. The digital audio data is recorded in an area adjacent to the recording areas for the corresponding video data. When the recorded digital audio data is reproduced, the reproduced data is temporarily stored in a reproduction-audio-data buffer memory 14, and then read out in synchronization with a read-out timing of the data in the reproduction buffer memory 10 or 11. The read-out audio data is decoded by a decoder 15, and then converted into analog data by a digital-to-analog (D/A) converter 16. The analog audio data is amplified by an amplifier 17, and finally supplied to the speaker 18.

Figure 3:
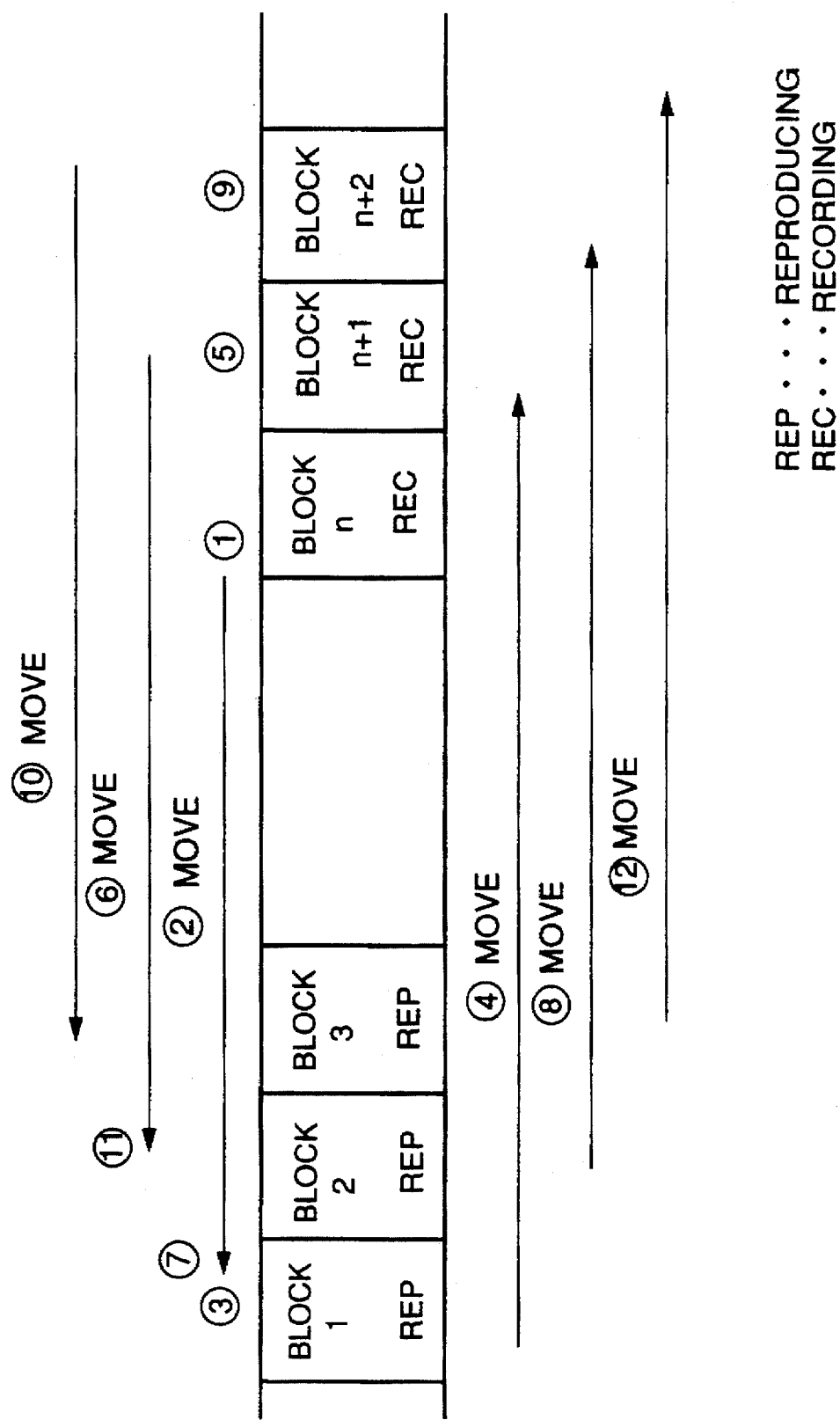
FIG. 3 is an illustration for explaining an operation of the recording system shown in FIG. 2.

FIG. 3 is an illustration for explaining the operation of the above-mentioned second embodiment. In FIG. 3, a number in a circle indicates an order of a step in the operation. Each of blocks 1 through n+2 corresponds to an area of the recording medium 6a in which area the predetermined amount of data corresponding to a capacity of the reception buffer memory 1 or 2 is to be recorded.

In block 1 is recorded the first predetermined amount of data, and in block n is recorded the nth predetermined amount of data. In FIG. 3, the operation is started from recording in the nth block. That is, the blocks 1 through n−1 have already been recorded. An arrow in FIG. 3 indicates a movement of the recording/reproducing head. Accordingly, the recording/reproducing head moves, after the recording in the nth block is completed, to the block 1 to reproduce the data already recorded in the block 1. The recording/reproducing head moves, after the reproducing of the data in the block 1 is completed, to the block n+1 to record the predetermined amount of data in the block n+1.

A description will now be given, with reference to FIG. 4, of a third embodiment of a recording system according to the present invention. FIG. 4 shows a block diagram of an essential part of the third embodiment according to the present invention. This embodiment is directed to a recording system having two video tapes, each of which can be operated independently.

In FIG. 4, a controlling unit 25 controls a selector 26, when receiving a recording-start command, to supply received information to a first tape-recording unit 28. At the same time, the controlling unit 25 supplies a command to a first tape-driving unit 27 to drive a first video tape 31 so as to start a recording operation of the first video tape 31.

When the controlling unit 25 receives a reproduction start command while the first video tape is in the recording process, the controlling unit 25 controls the selector 26 to supply the received information to a second tape-recording unit 30 instead of the first tape-recording unit 28. At the same time, the controlling unit 25 supplies a command to a second tape-driving unit 29 to drive a second video tape 32 so as to start a recording operation of the second video-tape. Additionally, the controlling unit 25 controls the first tape-driving unit 27 to rewind the first video tape 31 to a position from which the last recording was started. Then a first tape-reproducing unit 33 starts to reproduce the data recorded on the first video tape 31.

Since an end position of the last recording is memorized in the first tape-driving unit 27, the first tape-driving unit 27 notifies the controlling unit 25 when the first tape reaches the end position. The controlling unit 25 stops the reproducing operation of the first tape, and controls the selector 26 to supply the received information to the first tape-recording unit 28 so as to start a recording operation of the first video tape 31. During this switching operation, the first tape-driving unit 27 continues to drive the first video tape 31. At the same time, the controlling unit 25 send a command to the second tape-driving unit 29 to rewind the second video tape 32 to the position from which the last recording was started. The second tape-reproducing unit 34 then reproduces the recorded information on the second video tape 32. The above-mentioned operation is repeated.

In the above-mentioned operation, reproduction of the received information is interrupted during a rewinding operation of the first video tape 31 or the second video tape 32. This problem can be eliminated by converting the television signal into a digital signal and providing a reception buffer memory or a reproduction buffer memory as described in the above-mentioned second embodiment.

For example, when a notification is made by one of the driving units to the controlling unit 25 that the video tape being reproduced reaches almost the end position of the recorded area, the controlling unit 25 immediately stops the recording operation of the other tape and starts to rewind it. However, since it is too early to transfer the received information to the video tape being reproduced, the received information is stored in a reception buffer memory during a predetermined time in which the operation of the video tape is switched from the reproducing operation to the recording operation, and the recording speed is set faster than the storing speed to the reception buffer memory. The recording speed is set equal to the receiving speed of the information when the reception buffer memory becomes empty.

It should be noted that, in the above-mentioned structure of the third embodiment, the first tape-driving unit 27 and the second tape-driving unit 29 constitute a positioning unit 20a similar to the positioning unit 20 in the first embodiment.

Additionally, the received information to be recorded and reproduced is not limited to a television signal, and a general video signal which is transmitted by a radio frequency transmitter or through a cable may be applied.

In the recording and reproducing operation in the prior art, when a television program other than the television program currently on the screen is being recorded, the television program being recorded cannot be reproduced in it entirety until the television program being recorded ends even if the television program currently on the screen ends. However, this problem can be eliminated by using the present invention in which a reproducing operation of the previously recorded information of the television program currently being recorded is performed at the same time as a recording operation of the rest of the television program currently being received.

The present invention is not limited to the specifically disclosed embodiments, and variations and modifications may be made without departing from the scope of the present invention.

What is claimed is:

1. A recording system which records a video signal received from an external video-signal-supply source via a communication channel, the recording system being connected to a display unit having a screen on which an image is projected in accordance with a video signal supplied by the recording system, the recording system comprising:

a recording medium on which the video signal received from the external video-signal-supplying source is recorded;

recording means for recording the video signal received from said external video-signal-supplying source on said recording medium in response to a recording start command received when viewing of the video signal is interrupted;

reproducing means for reproducing the video signal recorded on said recording medium in response to a reproducing start command received when viewing of said video signal is resumed after an interruption; and controlling means for controlling operations of said recording means and said reproducing means so that said recording means starts a recording operation on said video signal during said interruption and saves a record start position of said recording means on said recording medium when said recording start command is received, and said reproducing means starts a reproducing operation on the video signal recorded on said recording medium at said record start position when said reproducing start command is received, said reproducing operation starting at said record start position on said recording medium to reproduce the video signal recorded on said recording medium during said interruption while said recording operation on the video signal continues simultaneously during reproduction of said video signal recorded during said interruption.

2. The recording system as claimed in claim 1, wherein said controlling means comprises positioning means which provides said record start position of said recording means on said recording medium and a reproduce start position of said reproducing means on said recording medium.

3. The recording system as claimed in claim 1, further comprising a telephone unit and wherein said recording start command is a detection signal which is generated when a receiver of said telephone unit is off-hooked, and said reproducing start command is a detection signal which is generated when said receiver of said telephone unit is on-hooked.

4. The recording system as claimed in claim 1, further comprising a door bell and wherein said recording start command is a detection signal which is generated when said door bell is rung.

5. The recording system as claimed in claim 1, further comprising a remote controller through which a command is input by an operator so that said recording start command and said reproducing start command are input through said remote controller.

6. The recording system as claimed in claim 3, wherein an image represented as a video signal received through said telephone unit is projected on said screen of said display unit.

7. The recording system as claimed in claim 4, further comprising a video camera so that an image represented as a video signal supplied by said video camera is projected on said screen of said display unit.

8. The recording system as claimed in claim 1, wherein said video signal received from said external video-signal-supplying source is a broadcast television signal.

9. The recording system as claimed in claim 2, wherein said recording medium comprises a recording disk, and the recording operation and the reproducing operation are performed alternately by a single recording/reproducing head sequentially moving on said recording disk in accordance with the determination made by said positioning means.

10. The recording system as claimed in claim 9, further comprising a pair of reception buffer memories and a pair of reproduction buffer memories, each of said reception buffer memories storing the video signal received from said external video-signal-supplying source alternately so that the video signal stored in one of said reception buffer memories is supplied to said recording means while the video signal currently being received is stored in the other of said reception buffer memories, and each of said reproduction buffer memories storing the video signal reproduced from said recording disk alternately so that the video signal stored in one of said reproduction buffer memories is suppled to said display unit while the video signal reproduced from said recording disk is stored in the other of said reproduction buffer memories.

11. The recording system as claimed in claim 10, further comprising a compressing unit and a decompressing unit, said compressing unit compressing the video signal supplied from said reception buffer memories to said recording means, and said decompressing unit decompressing the video signal supplied from said reproducing means to said reproduction buffer memories.

12. The recording system as claimed in claim 2, wherein said recording medium comprises a pair of video tapes so that the recording operation is performed on one of said video tapes while the reproducing operation is performed on the other of said video tapes.

13. The recording system as claimed in claim 12, further comprising a reception buffer memory which stores the video signal currently being received so that the video signal received during a switching of the recording operation from one of said video tapes to the other of said video tapes is temporarily stored in said reception buffer memory.

* * * * *

(12) EX PARTE REEXAMINATION CERTIFICATE (5270th)
United States Patent
Isaka

(10) Number: US 5,706,388 C1
(45) Certificate Issued: Feb. 14, 2006

(54) RECORDING SYSTEM RECORDING RECEIVED INFORMATION ON A RECORDING MEDIUM WHILE REPRODUCING RECEIVED INFORMATION PREVIOUSLY RECORDED ON THE RECORDING MEDIUM

(75) Inventor: Osamu Isaka, Kashiwa (JP)

(73) Assignee: Ricoh Company, Ltd., Tokyo (JP)

Reexamination Request:
No. 90/007,379, Jan. 11, 2005

Reexamination Certificate for:
Patent No.: 5,706,388
Issued: Jan. 6, 1998
Appl. No.: 08/777,057
Filed: Dec. 30, 1996

Related U.S. Application Data

(63) Continuation of application No. 08/330,587, filed on Oct. 28, 1994, now abandoned.

(30) Foreign Application Priority Data

Oct. 29, 1993 (JP) .............................................. 5-294403

(51) Int. Cl.
*H04N 5/85* (2006.01)
*H04N 5/91* (2006.01)

(52) U.S. Cl. ......................................... 386/125; 386/46
(58) Field of Classification Search ................. 386/125, 386/46, 52, 62, 65, 68, 67, 91, 64, 83; 348/714, 348/715, 154
See application file for complete search history.

(56) References Cited

U.S. PATENT DOCUMENTS

| | | | |
|---|---|---|---|
| 5,241,428 A | 8/1993 | Goldwater et al. |
| 5,371,551 A | 12/1994 | Logan et al. |
| 5,555,463 A | 9/1996 | Staron |
| RE36,801 E | 8/2000 | Logan et al. |

FOREIGN PATENT DOCUMENTS

JP 4-123366 4/1992

*Primary Examiner*—Robert Chevalier

(57) ABSTRACT

A recording system performs a reproducing operation for previously recorded information without stopping a recording operation for information currently being received. A video signal is received from an external video-signal-supplying source via a communication channel. The recording system is connected to a display unit having a screen. A recording medium is provided on which the video signal is recorded. A recording unit automatically records the video signal currently being received on the recording medium when a recording start command is received while an image according to the video signal currently being received is being projected. A reproducing unit reproduces the video signal recorded on the recording medium when a reproducing start command is received. A controlling unit controls operations of the recording unit and the reproducing unit so that the reproducing operation on the video signal previously recorded on the recording medium and the recording operation on the video signal currently being received are performed at the same time, and thereby the video signal currently being received is recorded on the recording medium while an image is projected in accordance with the video signal previously recorded on the recording medium.

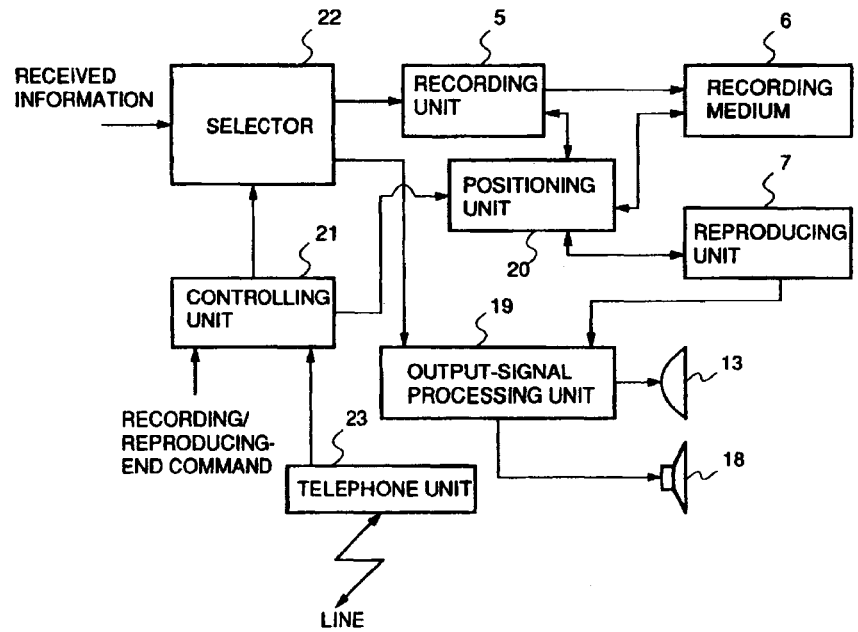

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–13 is confirmed.

* * * * *